United States Patent
Rhodes et al.

(10) Patent No.: US 8,940,217 B1
(45) Date of Patent: Jan. 27, 2015

(54) APPARATUS AND METHOD FOR MOLDING BRASSIERE CUPS

(75) Inventors: Lynn M. Rhodes, Tobaccoville, NC (US); Richard W. Kelley, Germanton, NC (US); Roger D. Warren, Claremont, NC (US)

(73) Assignee: HBI Branded Apparel Enterprises, LLC, Winston-Salem, NC (US)

( * ) Notice: Subject to any disclaimer, the term of this patent is extended or adjusted under 35 U.S.C. 154(b) by 288 days.

(21) Appl. No.: 13/538,109

(22) Filed: Jun. 29, 2012

(51) Int. Cl.
B29C 59/02 (2006.01)

(52) U.S. Cl.
USPC ........... 264/320; 264/293; 264/292; 264/319; 425/357; 425/411; 425/412; 425/416; 425/385; 425/394; 425/397

(58) Field of Classification Search
CPC ........ A41C 5/00; A41C 5/005; B29C 51/004; B29C 33/0033; B29C 51/20; B29C 51/264; B29C 55/00; B29C 55/005
USPC ......... 264/293, 299, 155, 292, 153, 154, 163, 264/296, 320, 319, 323, 322; 425/357–359, 425/406, 408, 411, 412, 415–416, 423, 457, 425/469, 403, 385, 394, 397, 398, 400, 410, 425/344, 346, 324
See application file for complete search history.

(56) References Cited

U.S. PATENT DOCUMENTS

| | | | |
|---|---|---|---|
| 2,285,967 A | 6/1942 | Hardy | |
| 2,460,674 A | 2/1949 | Bihaly | |
| 2,580,566 A | 1/1952 | MacHenry et al. | |
| 2,644,779 A | 7/1953 | Manning | |
| 3,058,154 A * | 10/1962 | Howard et al. | ............... 156/222 |
| 3,064,329 A | 11/1962 | Westberg et al. | |
| 3,164,655 A | 1/1965 | Howard et al. | |
| 3,527,858 A | 9/1970 | Braxton et al. | |
| 3,880,561 A * | 4/1975 | Ferro | ............................. 425/144 |
| 3,981,670 A | 9/1976 | Levy | |
| 4,008,029 A | 2/1977 | Shokite | |
| 4,080,416 A * | 3/1978 | Howard | ......................... 264/258 |
| 4,127,374 A * | 11/1978 | Ammeraal | .................... 425/289 |
| 4,162,885 A | 7/1979 | Asel | |
| 4,172,002 A | 10/1979 | Gluckin | |
| 4,572,195 A | 2/1986 | Hyams | |
| 4,645,629 A | 2/1987 | Stern | |
| 5,033,955 A * | 7/1991 | Faig et al. | ..................... 425/589 |
| 7,458,877 B2 | 12/2008 | Yu | |
| 7,556,553 B2 | 7/2009 | Falla et al. | |
| 7,666,059 B2 | 2/2010 | Fall et al. | |
| 2005/0051923 A1 * | 3/2005 | Warren | ......................... 264/163 |

* cited by examiner

*Primary Examiner* — Amjad Abraham
*Assistant Examiner* — Ninh Le
(74) *Attorney, Agent, or Firm* — Womble Carlyle Sandridge & Rice, LLP

(57) ABSTRACT

An apparatus and method are provided for molding breast cups in a seamless circularly-knitted brassiere having a breast-covering portion and a torso encircling band, the apparatus comprising a base, a rear wall extending upwardly from the base, an upper mold plate extending outwardly and substantially horizontally from the rear wall, the upper plate having a pair of spaced openings formed therethrough, the openings spaced and dimensioned to correspond to a pair of breast cups, and a plate intermediate to the base and the upper mold plate, and being vertically moveable between a first, upper position and a second, lower position for securing a brassiere blank in position against the upper plate for the molding of breast cups therein.

13 Claims, 15 Drawing Sheets

APPARATUS AND METHOD FOR MOLDING BRASSIERE CUPS

FIELD OF THE INVENTION

The invention relates to circular knit, seamless bra constructions. More particularly, the present invention relates to an apparatus and method for molding the breast cups of a seamless, circularly knitted brassiere.

BACKGROUND OF THE INVENTION

Brassieres that are formed on circular knitting machines comprise a knitted tube that is subsequently turned inside itself to form a double-layer fabric construction. The knitting machine is programmed to form a pair of shallow and spaced breast cups, and cut lines for arm and head openings. Brassieres formed in this manner are intended to be sheer, and thus do not include laminated foam layers. Rather, the circular knitting machine is programmed to form a pair of loosely-knitted areas corresponding to the breast cups. In the case of small-breasted women, this knitted construction is sufficient when the brassiere is completed, i.e., torso-encircling straps, and shoulder straps, as desired, are attached and the fabric edges are trimmed.

When larger cup sizes are desired, cup molding machines are used to mold only the fabric layers comprising the cups of the completed brassiere. As best shown in FIG. 1, a typical molding apparatus 10 comprises a flat bed 12 having a lower mold plate 14 with a pair of spaced-apart female cavities 13 dimensioned for the desired diameter of the breast cup. An upper male mold plate 15 includes a pair of spaced-apart male mold members 17 that are positioned above the female cavities and corresponding in diameter to the pair of female cavities. Since lamination is not being performed, the male molds serve only to stretch and shape the double-layer fabric of the brassiere, shown generally as A. The breast cup areas A1 and torso-encircling straps A2 must be placed flat on the flat bed 12 of the molding apparatus 10 for the molding step. Spaced-apart hold-down members 19 are provided to tautly secure the brassiere A in place for the molding step. This molding machine and method are not an issue with brassieres having rear closures where the torso-encircling straps A2 can be spread out, but is a significant problem with sports brassieres, which are formed to slip-over and do not have rear closures. As shown in FIG. 1, there is no practical means for wrapping a sports brassiere around the flat bed 12. Thus, for these brassieres, as shown in FIG. 2, the torso-encircling straps must be cut so that the brassiere can be placed flat on the molding surface. Following molding, the straps must then be seamed, which adds an additional step to the manufacturing process. Alternatively, another method attempted has been to fold the double layer construction such that the two brassiere cup areas overlap, and then subsequently mold all four layers with a single male and female mold. Molding four layers simultaneously, however, with a single male mold and single female cavity, yields non-uniformly, unsatisfactory, molded brassiere cups.

SUMMARY OF THE INVENTION

It is an object of the present invention to provide an apparatus and method for molding the cups in a seamless, circularly knitted brassiere, such as a sports brassiere, having no rear closure. In one embodiment, the apparatus comprises a base, a rear wall extending upwardly from the base, and an upper plate extending outwardly and substantially horizontally from the rear wall. The upper plate has a pair of spaced openings formed therethrough, the openings spaced and dimensioned to correspond to a pair of breast cups. Intermediate to the base and the upper plate is an intermediate plate, being vertically moveable between a first, upper position and a second, lower position for securing a brassiere blank tautly in position against the upper plate for the molding of breast cups therein.

The method of molding the cups in a circularly knitted seamless brassiere comprises placing the breast-covering portion of a substantially completed seamless brassiere on an upper mold plate and aligning breast cup areas of the brassiere with a corresponding pair of mold openings in the upper mold plate. The torso encircling band of the brassiere is then wrapped around a vertically moveable lower plate, which is subsequently caused to move vertically downward, wherein the torso encircling portion of the brassiere and the breast covering portion are pulled taut. A male mold portion is then lowered downwardly to engage the upper mold plate, wherein male mold elements move through the openings in the upper mold plate to mold a pair of breast cups.

BRIEF DESCRIPTION OF THE DRAWINGS

The foregoing and still other objects and advantages of the present invention will be more apparent from the following detailed explanation of embodiments of the invention in connection with the accompanying drawings.

DETAILED DESCRIPTION

Figure 1:
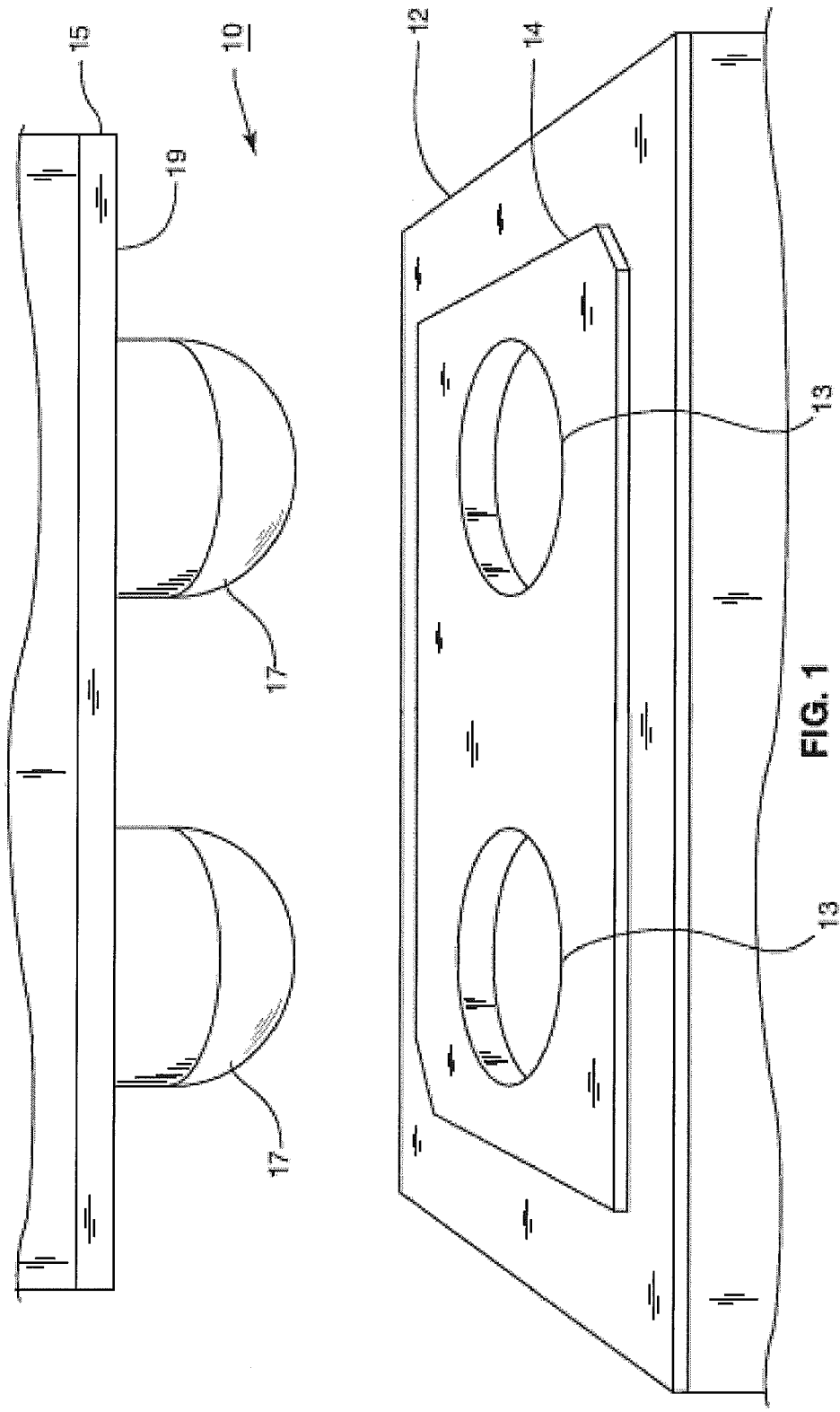
FIG. 1 illustrates one conventional method of molding breast cups in a circularly-knitted brassiere.
Figure 2:
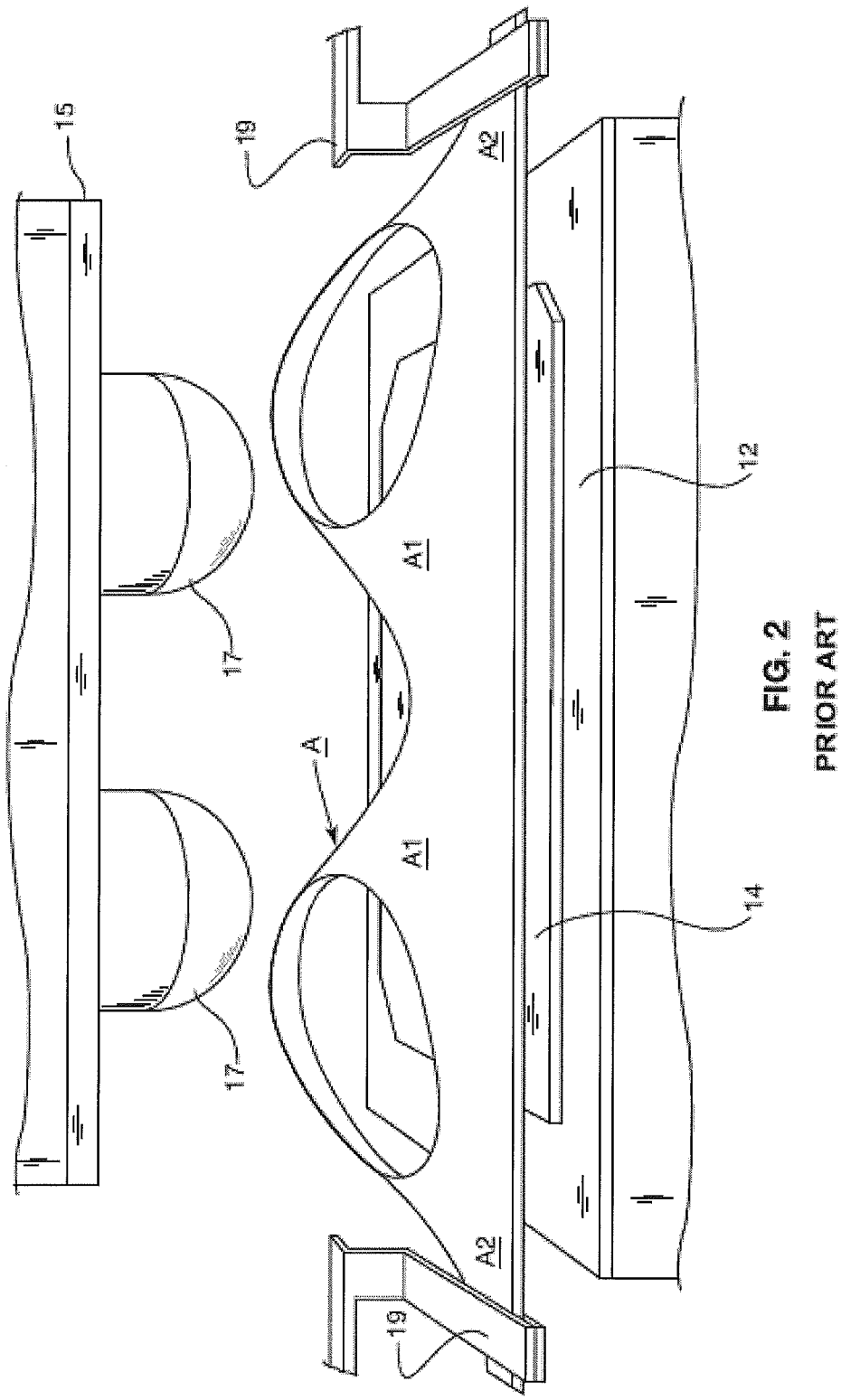
FIG. 2 is an environmental view of the conventional method of molding cups in a circularly-knitted brassiere.

As best shown in FIGS. 3 through 8, one aspect of the present invention is directed to an apparatus, shown generally as 100, for molding breast cups in seamless, circularly-knitted brassieres. Referring to FIG. 3 through 6, the molding apparatus comprises a base 110, a rear wall 120, an upper mold plate 130, and a vertically movable intermediate plate 140. In one embodiment, each of the base 110, rear wall 120, upper mold plate 130, and intermediate plate 140 may be formed of stainless steel and may be cast or machined from solid stock. As will be appreciated, other rigid materials that would be suitable to withstand the pressure of the molding process may be used. Also, the other components forming the molding apparatus 100 may each be formed of stainless steel or other suitable rigid materials.

As will be understood from FIG. 1, the molding apparatus 100 should be dimensioned for positioning it on a conventional molding machine so that it covers the lower mold plate 14 and spaced-apart existing female cavities 13 of the conventional machine 10 and properly aligns with the male molding plate 15 and the pair of male mold elements 17. To prevent movement of the molding apparatus during the molding process, mounting hardware or fasteners (not shown) may be provided.

In the embodiment shown in the Figures, the base 110 of the present molding apparatus 100 is approximately 11 inches in length and approximately 18 inches in width, but may be longer and wider, as desired for additional stability. While the embodiment shown in the Figures shows the upper mold plate 130 of the present apparatus 100 having the same approximate dimensions as the base 110, the dimensions may be varied so long as the molding process achieves the desired results. The rear wall extends the length of the base in this embodiment; however, the length does not necessarily need to extend the entire length. The height of the rear wall is between approximately 4 inches and 8 inches, which will accommodate the molding of seamless, circularly-knitted breast cups in the range of sizes 32AA and 44DDD.

Figure 4:
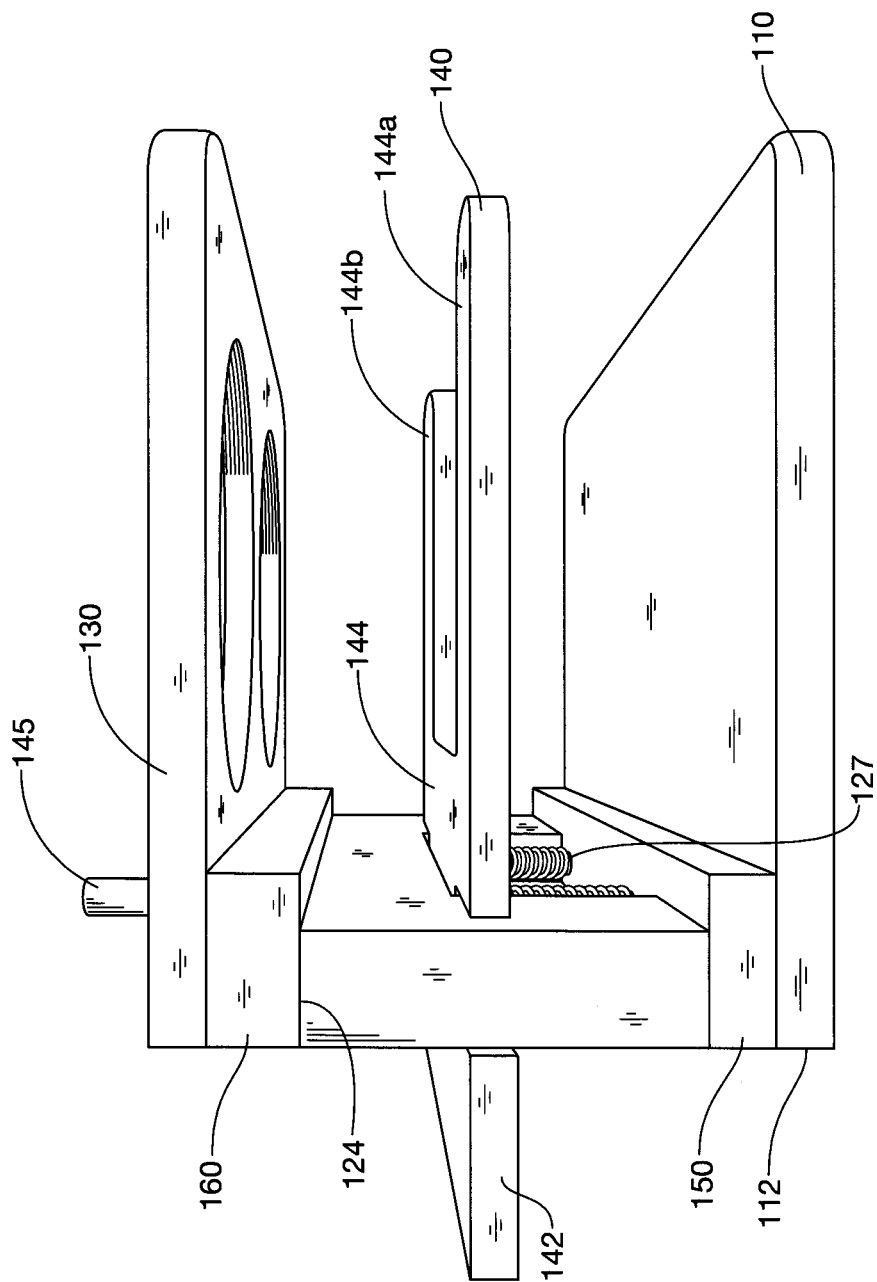
FIG. 4 is a side perspective view of the molding apparatus of FIG. 3 with the intermediate plate in a first, upper position.
Figure 5:
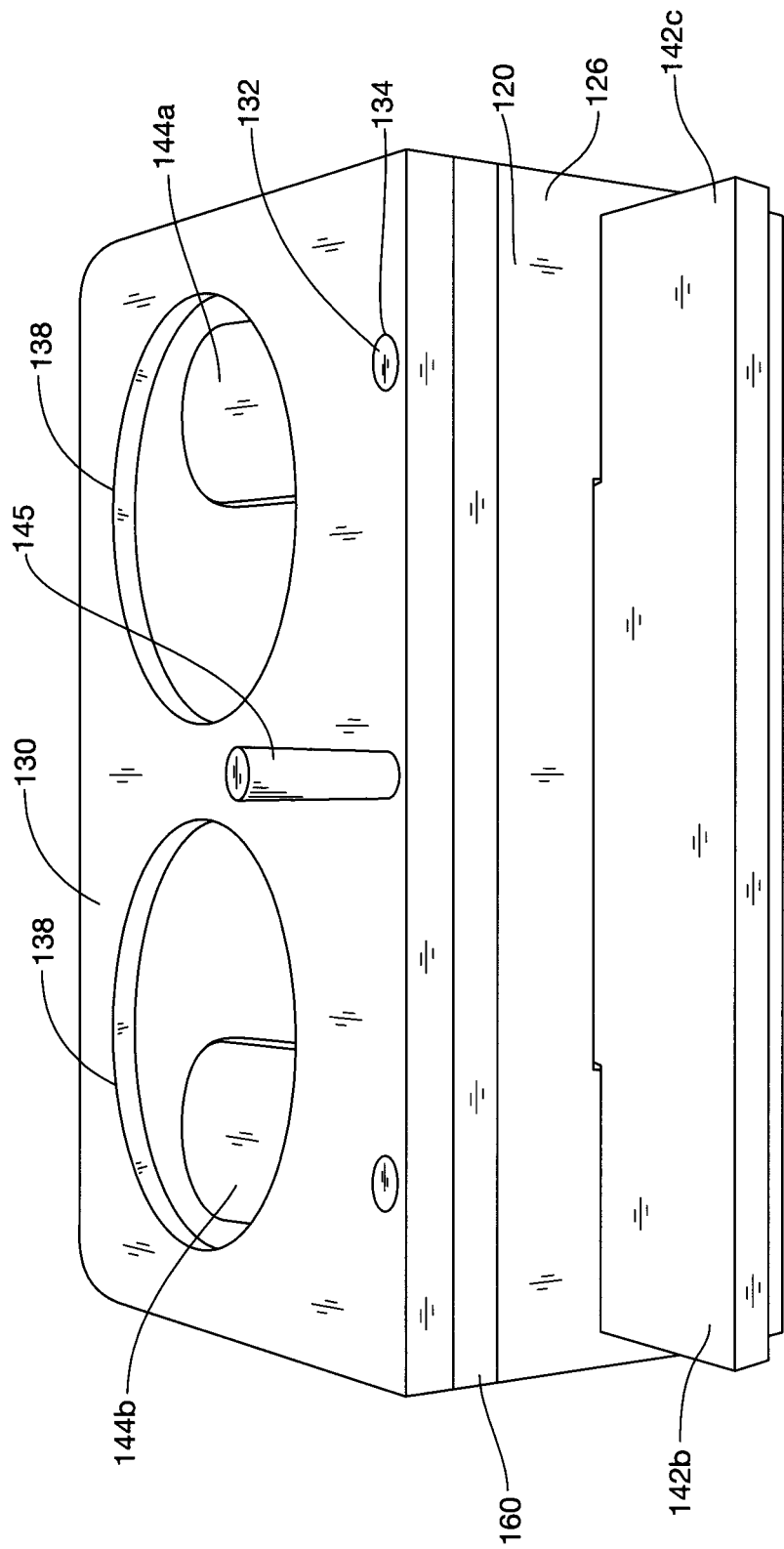
FIG. 5 is a rear perspective view of the molding apparatus of FIG. 3 with the intermediate plate in the first, upper position.

Optionally, a lower bar 150 is provided, as shown in FIG. 4. The lower bar 150 extends inwardly from the rear edge 112 of the base 110 and has a height selected to limit the downward movement of the intermediate plate 140. As will be appreciated, with the exception of the upper mold plate 130, the various components of the molding apparatus 100 are welded along seams formed at the juncture of the components, or are otherwise bonded along their respective surface areas with suitable bonding adhesives capable of securing the components to withstand the pressure of the molding process.

Attached to the base 110, or to the optional lower bar 150, is a rear wall 120 that extends vertically upward from the base 110. As will be discussed in greater detail below, a rectangular slot 122 is formed through the central part of the rear wall 120 and is dimensioned for vertical movement of the intermediate plate 140 during the molding process.

Figure 3:
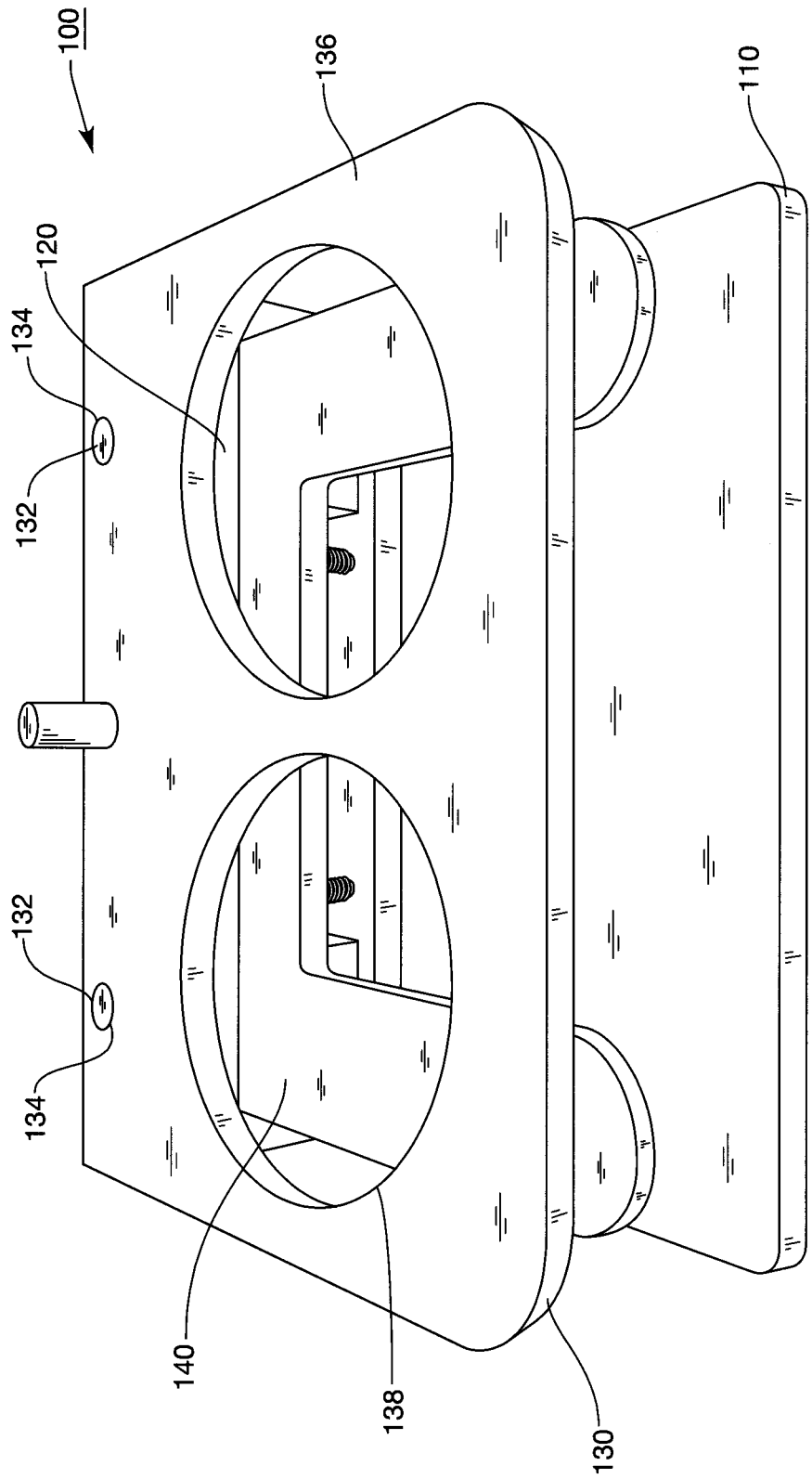
FIG. 3 is a front perspective view of an embodiment of the molding apparatus of the present invention.

Removably attached to the top 14 of the rear wall 120 is the upper mold plate 130 with conventional fasteners 132, as shown in FIG. 3, such as screws or bolts. Apertures 134 in the rear of the upper mold plate 130 are formed such that the fasteners will engage threaded portions (not shown) in the rear wall 120, and will be either flush with or slightly recessed with respect to the upper surface 136 of the rear wall 120 so that they do not interfere with the male mold plate 15 during the molding process. Optionally, an upper bar 160 may be attached intermediate between the rear wall 120 and the upper mold plate 130 to limit movement and provide greater stability to the upper mold plate 130. In one embodiment, the optional upper bar 160 may be dimensioned and attached to permit raising the upper mold plate 130 in order to allow deeper breast cups to be formed. Having a removable upper mold plate 130 provides the advantage of the upper mold plate 130 being interchangeable for molding of breast cups of different diameters, depths, and spacing. As shown in the Figures, each upper mold plate 130 comprises spaced apart circular apertures 138 corresponding to a selected diameter and spacing of the desired pair of breast cups.

Positioned between the base 110 and the upper mold plate 130 is an intermediate plate 140. As will be discussed in greater detail below, the intermediate plate 140 is vertically movable within the slot 122 between a first, upper position, and a second, lower position between the base 110 and the upper mold plate 130. In one embodiment, the intermediate plate 140 comprises a rear portion 142 with a portion 142a corresponding in length to the length of the slot 122, and which extends through the slot 122 of the rear wall 120, and flange portions 142b, 142c, which extend along the outer surface 126 of the rear wall 120. The intermediate plate further 140 comprises a forward portion 144, which substantially corresponds to the length of the base 110 and the upper mold plate 130. While the intermediate plate could be a generally rectangular solid plate, in one embodiment, the forward portion 144 comprises a pair of outwardly extending, spaced-apart, and parallel arms 144a and 144b, which are configured to secure the seamless, circularly-knitted brassiere in a taut position against the upper mold plate 130 and over the apertures 138 when the arms 144a, 144b are in the second, lower position.

Figure 6:
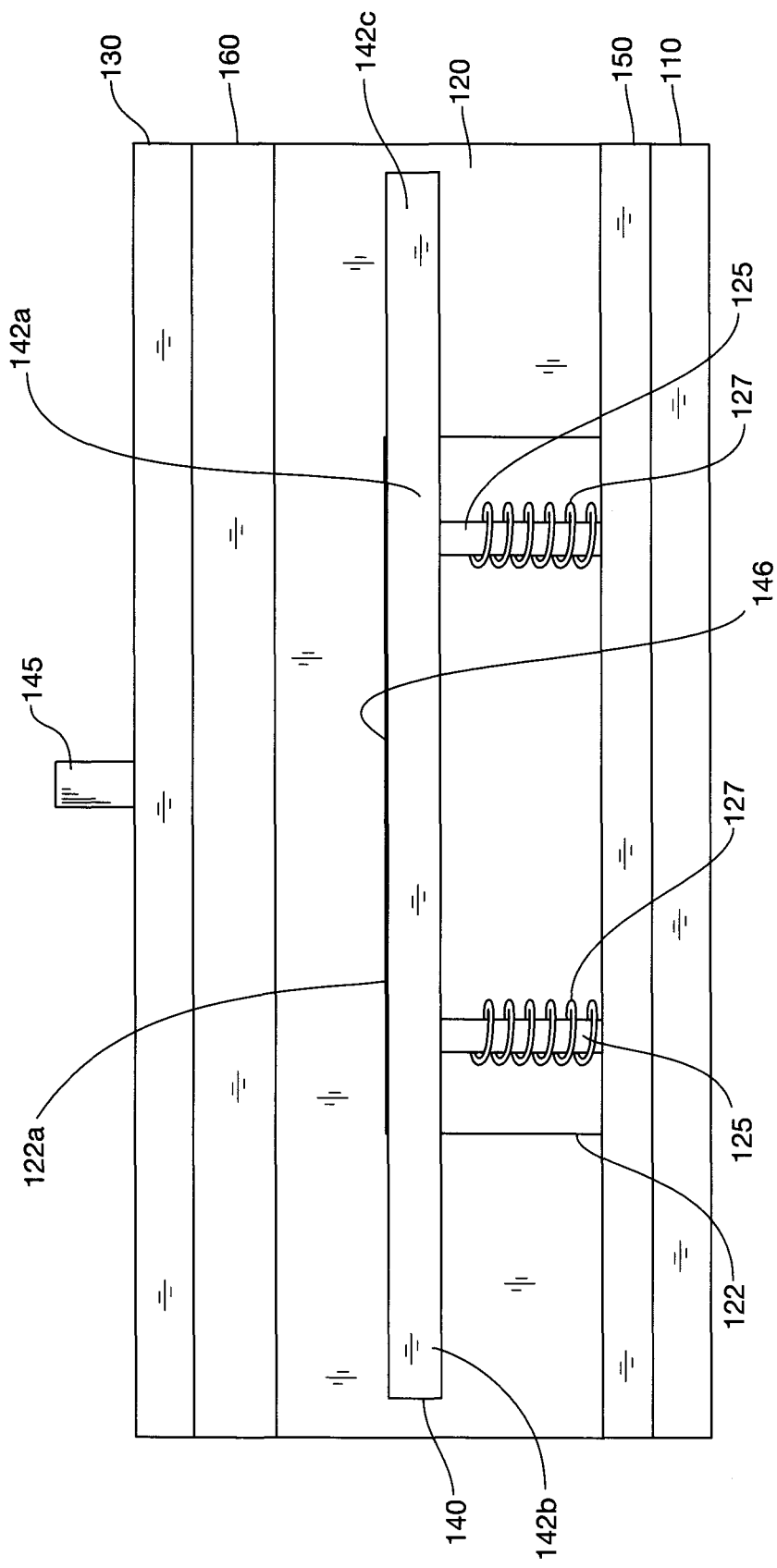
FIG. 6 is a rear view of the molding apparatus of FIG. 3 with the intermediate plate in the first, upper position.
Figure 7:
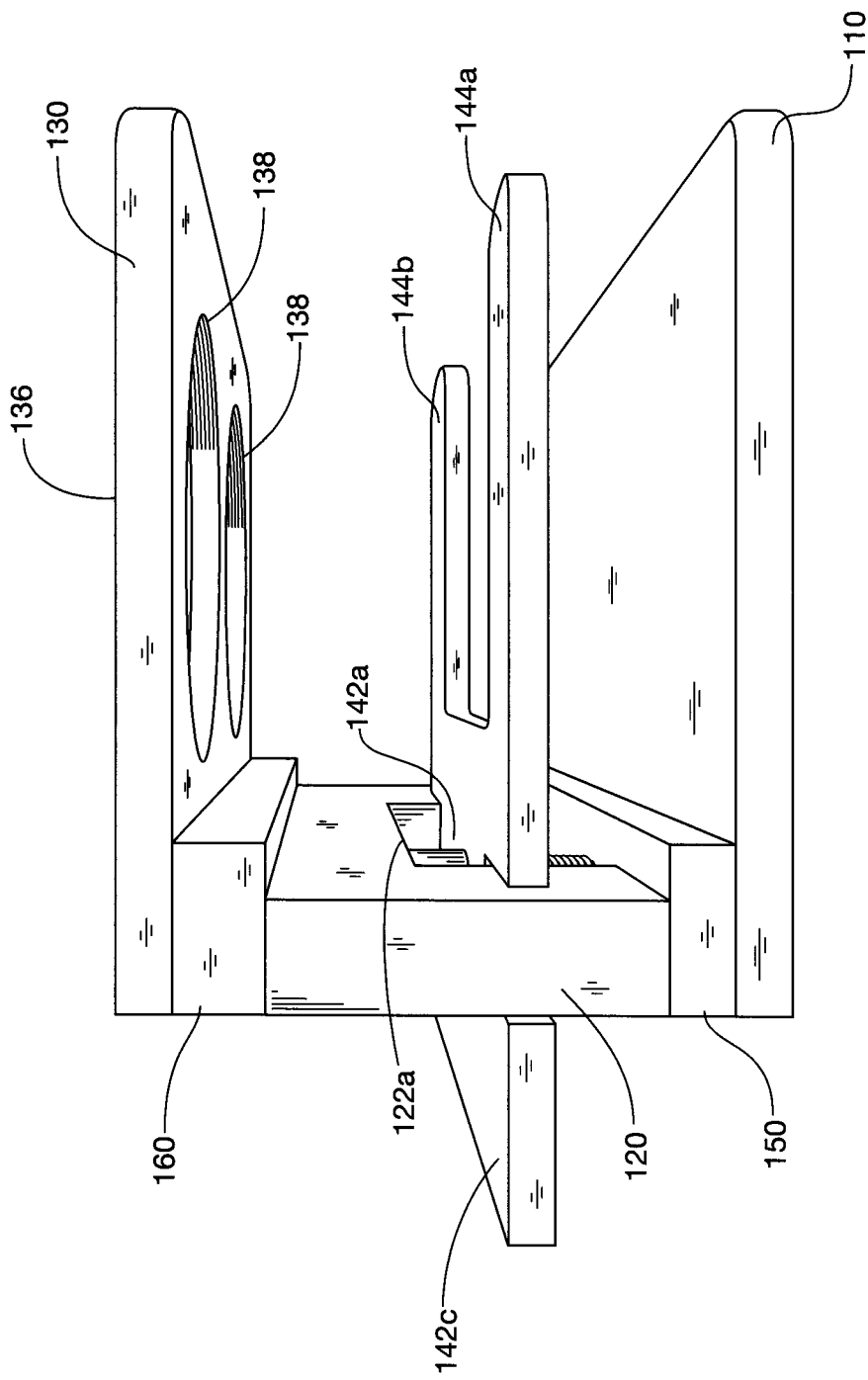
FIG. 7 is a side perspective view of the molding apparatus of FIG. 3 with the intermediate plate in the second, lower position.

To secure the intermediate plate 140 in position so that lateral movement is prevented during the molding process and to facilitate vertical movement of the intermediate plate during the molding process, a pair of spaced-apart vertical posts 125 are provided. The posts 125 extend from the base 110, or the lower block 150 if provided, within the slot 122 upwardly to the top 122a of the slot 122. The posts 125 may be held in position by recesses within the base 110 or lower block 150 and the top of the slot 122, or may be affixed thereto by welding or other adhesives bonding to the surfaces thereof. While shown as being round rods, the posts 125 are not limited to that geometric cross-section. As will be better understood from the description below, springs 127 encircle the posts 125 beneath the intermediate plate 140 to bias the intermediate plate 140 in the first, upper position against the top 122a of the slot 122 in the rear wall 120, as best shown in FIG. 4, 6, or 7. In the embodiment shown, the springs 127 are compression springs formed of a suitable metal such as stainless steel or carbon steel having a spring constant of between about 10 lb and 25 lb.

Figure 8:
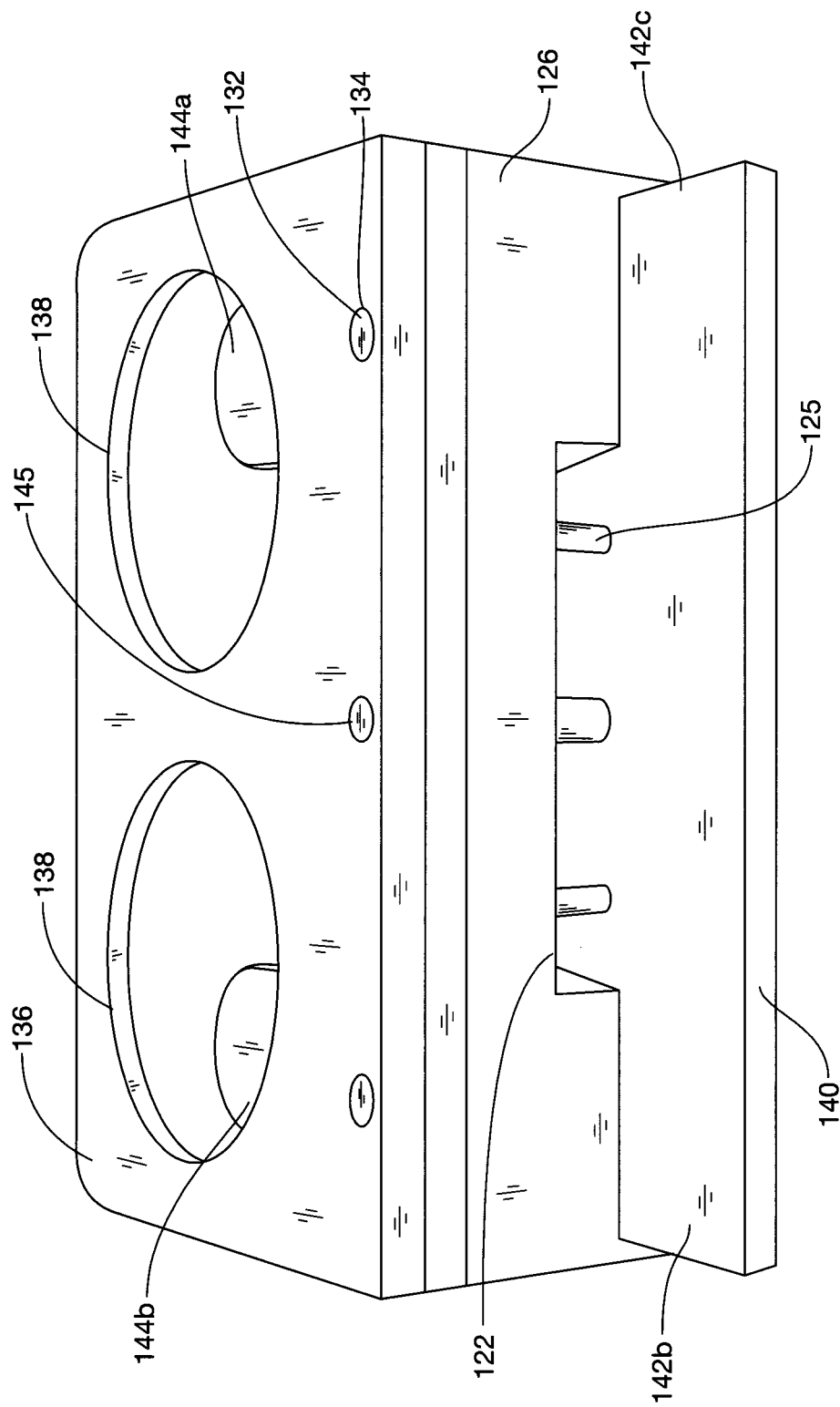
FIG. 8 is a rear perspective view of the molding apparatus of FIG. 3 with the intermediate plate in the second, lower position.
Figure 9:
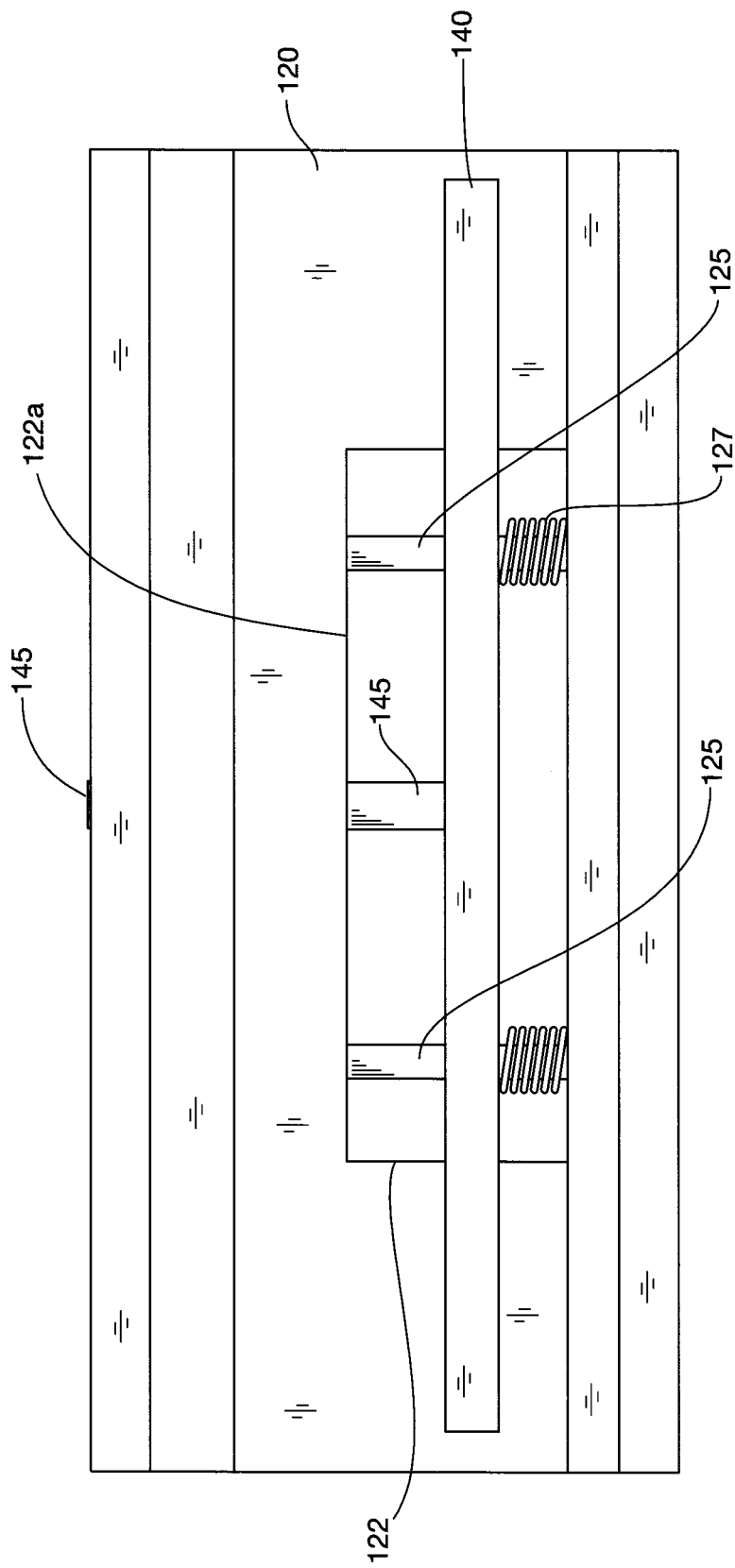
FIG. 9 is a rear view of the molding apparatus of FIG. 3 with the intermediate plate in the second, lower position.

As best shown in FIGS. 6 through 8, the molding apparatus 100 further comprises a centrally-positioned post 145, which extends from and is attached to the upper surface 146 of portion 142a of the intermediate plate 140, and which extends upwardly through the rear wall, the upper block 160, if provided, and the upper mold plate 130. When the intermediate plate 140 is biased upwardly in the first, upper position, the post 145 extends upwardly a selected distance above the upper surface 136 of the upper mold plate 130. So constructed, when the male mold plate 15 is lowered for engagement with the upper surface 136 of the upper mold plate 130, the lower surface 19 of the male mold plate 15 will engage and depress the post 145, forcing the intermediate plate 140 downwardly to the second, lower position with the springs 127 in tension, as best shown in FIG. 8. As shown in FIG. 8, the compressed springs 127 maintain the intermediate plate 140 slightly above the base 110, or lower block 150 if provided.

Figure 10:
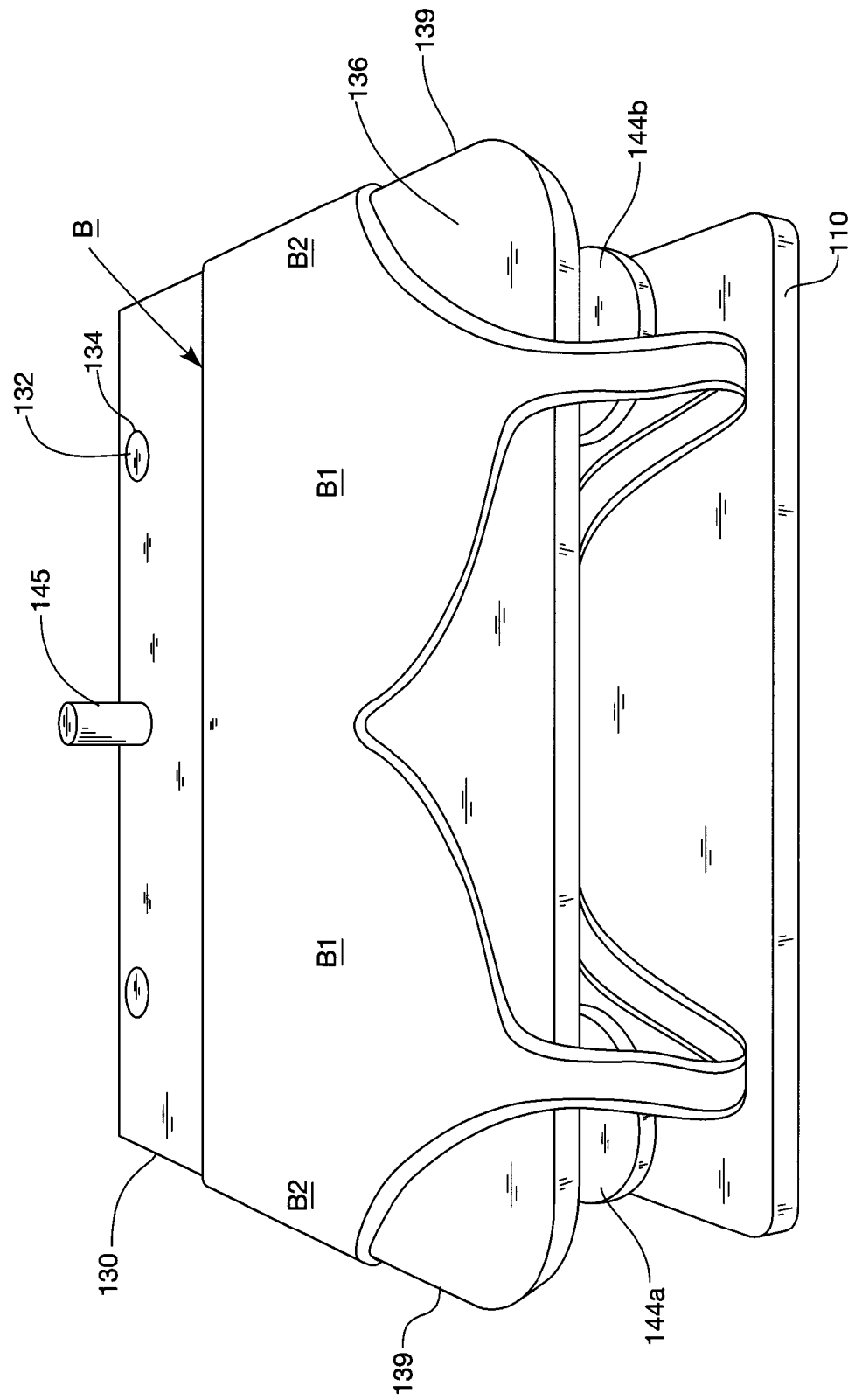
FIG. 10 is a front environmental view of a seamless, circularly knitted brassiere placed on the apparatus of the present invention with the intermediate plate in the first, upper position.
Figure 11:
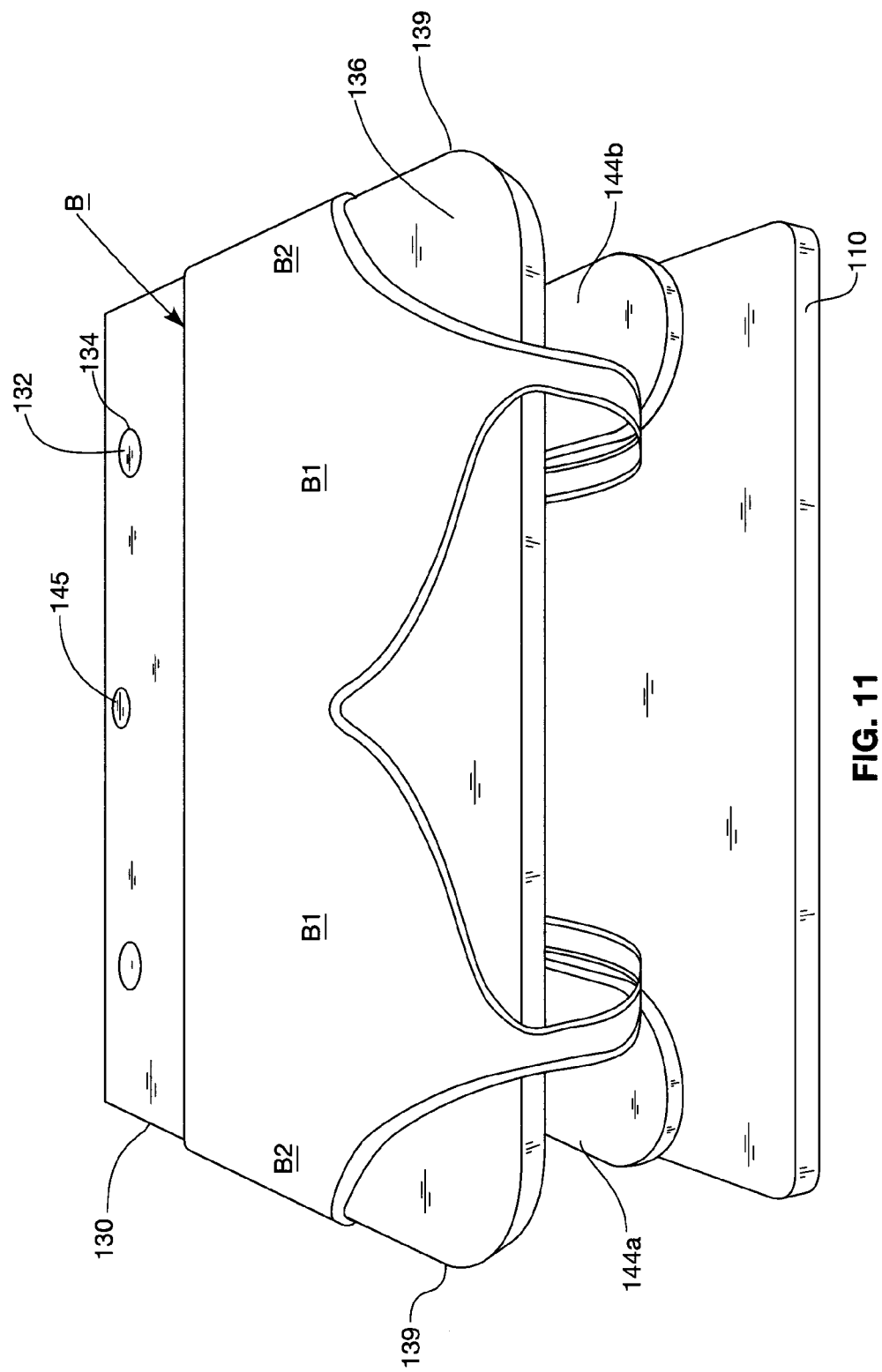
FIG. 11 is a front environmental view with the intermediate plate in the second, lower position apparatus and the brassiere of FIG. 3 stretched and taut in preparation for molding of the breast cups.

Turning now to FIGS. 9 through 14, the method of the present invention is illustrated. As shown in FIG. 10, a seamless circularly-knitted brassiere, designated as B, such as a sports brassiere, for example, is placed upon and wrapped around the edges 139 of the upper surface 136 of the upper mold plate 130, and around the edges 149 and beneath the arms 144a, 144b of the intermediate plate 140, with the intermediate plate 140 in the first, upper position. When properly placed on the molding apparatus 100, each of the breast cup regions B1 of the brassiere B will be situated over one of the pair of apertures 138 formed through the upper mold plate 130. In this initial loading position, and as best shown in FIGS. 10 and 11, the torso-encircling strap B2 will be in a relaxed position with little or no tension applied by the arms 144a, 144b of the intermediate plate 130. This facilitates the ease in placing the brassiere on the molding apparatus 100. While the brassiere shown in the Figures includes a pair of shoulder straps, it will be appreciated that the molding apparatus 100 does not require shoulder straps and performs the same breast cup molding on a strapless brassiere, since tension need only be applied to the breast covering front and breast cup areas B1 of the brassiere B, and the torso-encircling strap B2.

Figure 12:
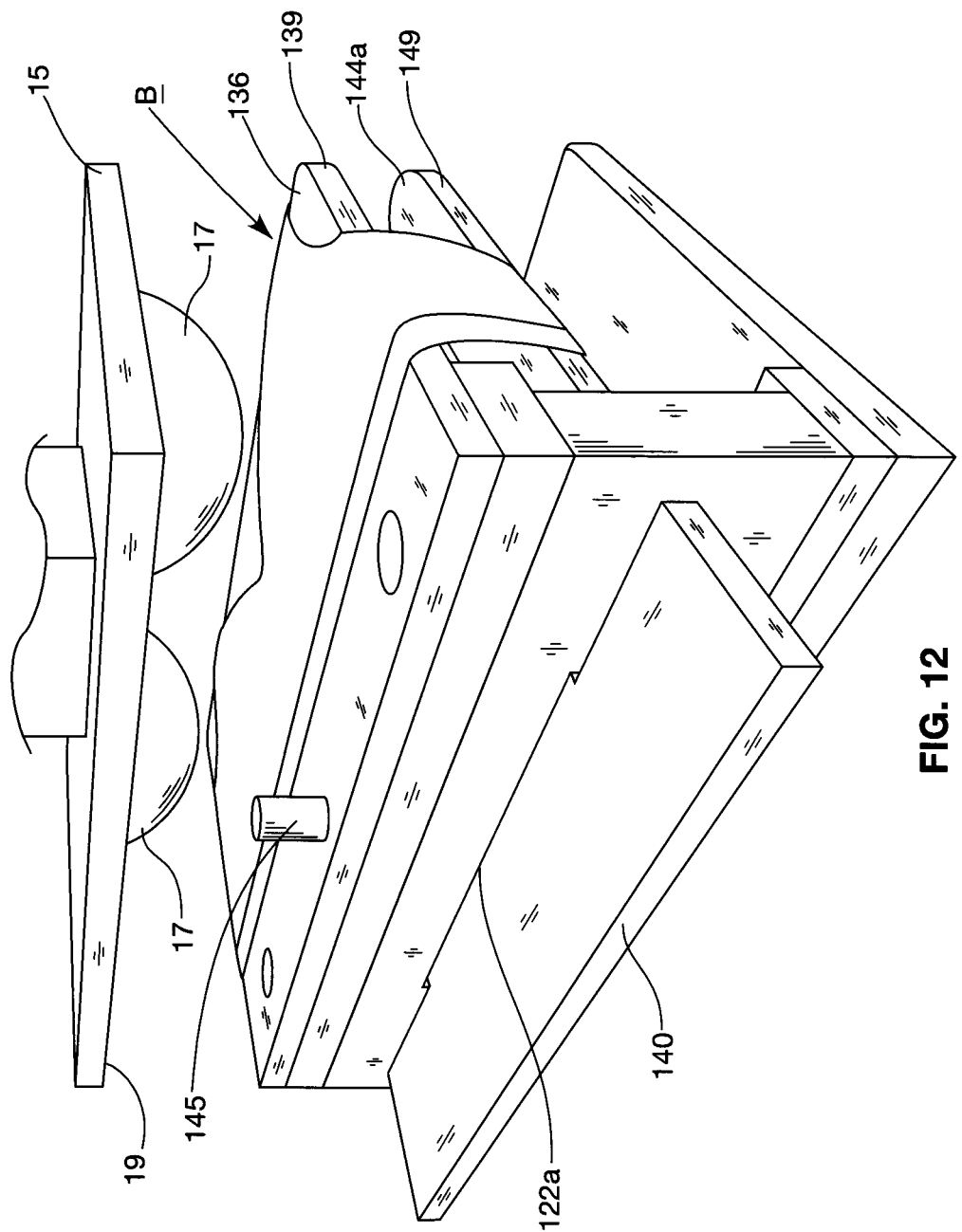
FIG. 12 is an environmental view illustrating the relative positions of the molding apparatus of the present invention and the male molding plate with male mold elements before the molding step.
Figure 13:
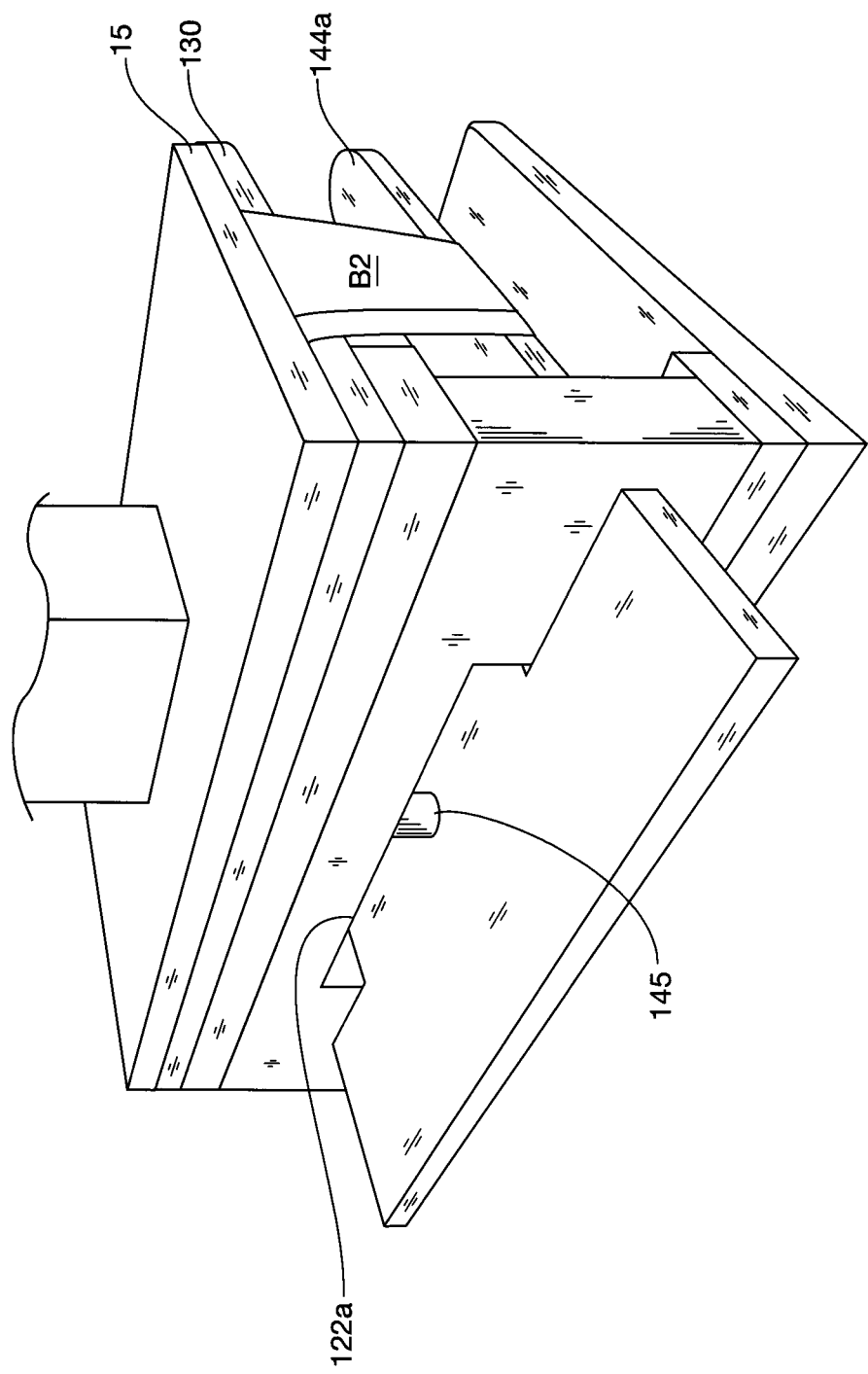
FIG. 13 is an environmental view illustrating the relative positions of the molding apparatus and the male molding plate during the molding step.

Again, and as best shown in FIGS. 10 and 12, when the male mold plate 15 is lowered for engagement with the upper mold plate 130, the male mold plate 15 engages and depresses the central post 145, forcing the intermediate plate 130 downwardly to the second, lower position. This simultaneously creates tension on the front of the brassiere B, including the breast cup areas B1 atop the apertures 138 in the upper mold plate 130, and on the torso-encircling strap B2, thus holding the breast cup areas B1 in a taut position during molding. At the same time that the intermediate plate 130 is forced to the second, lower position, the male mold elements 17 begin to engage the breast cup areas B1 of the taut brassiere B. As best shown in FIG. 12, with the male mold plate 15 fully engaged with the upper surface 136 of the upper mold plate 130, the male mold elements 17 have completed the breast cup molding process. As is conventional, the male mold elements 17 may be heated to facilitate a permanent mold of the breast cups B1. In one embodiment, the mold elements 17 may be heated to a temperature of between about 380 and 410 degrees Fahrenheit, and held in position for a dwell time of between about 30 and 65 seconds. Following the dwell time, and as shown in FIG. 13, the male mold plate 15 is raised, the male mold elements 17 disengage the molded cups, and the brassiere is complete.

Figure 14:
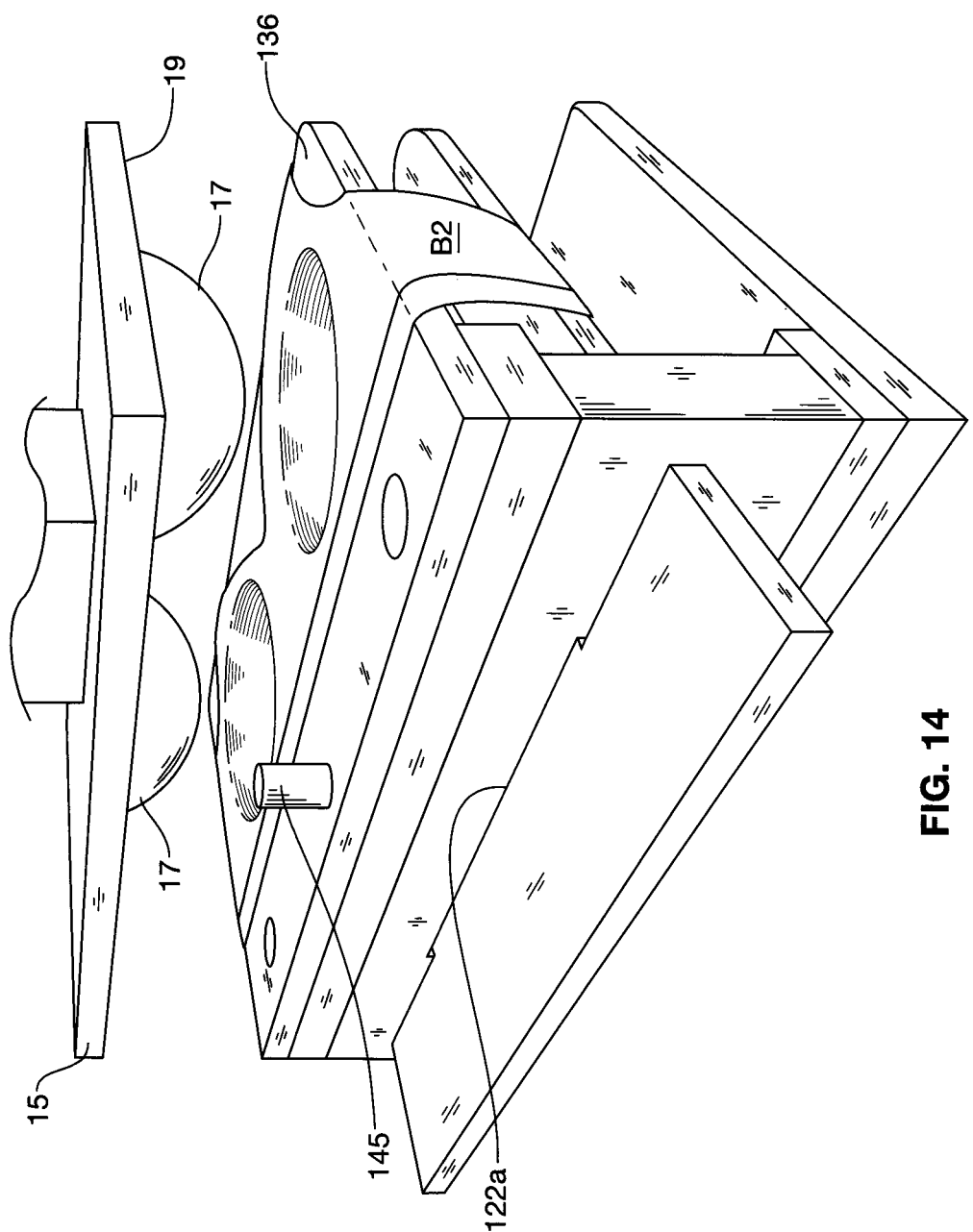
FIG. 14 is an environmental view illustrating the relative positions of the molding apparatus of the present invention and the male molding plate following the molding step.
Figure 15:
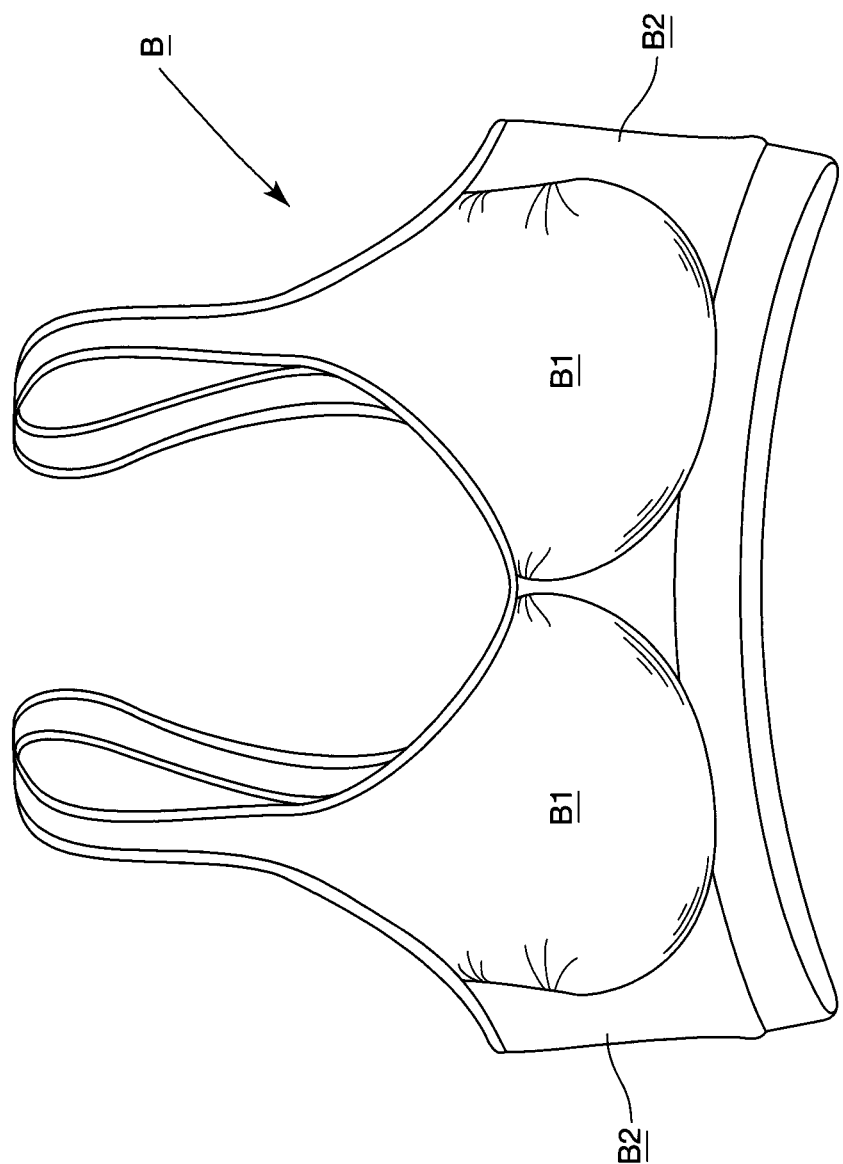
FIG. 15 is a front perspective view of a completed brassiere illustrating the molded breast cups.

Upon raising the male mold plate 15, the intermediate plate 130 is biased back to the first, upper position and tension on the brassiere B is relaxed, allowing the completed brassiere B to be removed from the molding apparatus 100. Lastly, as shown in FIG. 14, a complete seamless circularly-knitted brassiere B is shown with breast cups B1 molded to the desired size, and is ready for subsequent dyeing, packaging, etc.

It should be understood that the foregoing descriptions and examples are only illustrative of the invention. Various alternatives and modifications thereof can be devised by those skilled in the art without departing from the spirit and scope of the present invention. Accordingly, the present invention is intended to embrace all such alternatives, modifications, and variations.

We claim:

1. An apparatus for molding breast cups in a seamless, circularly-knitted brassiere having a breast-covering portion and a torso encircling portion, the apparatus comprising:
   a base;
   a rear wall extending upwardly from the base;
   an upper mold plate extending outwardly and substantially horizontally from the rear wall, the upper mold plate having a pair of spaced openings formed therethrough, the openings spaced and dimensioned to correspond to a pair of breast cups;
   an intermediate plate between the base and the upper mold plate, and being vertically moveable between a first, upper position and a second, lower position for securing a seamless brassiere in position against the upper mold plate for the molding of breast cups therein; and
   a projecting element extending upwardly from a top surface of the intermediate plate through the rear wall, and upwardly beyond an upper surface of the upper mold plate, the projecting element configured to engage a lower surface of a male mold plate, wherein when the male mold plate is lowered and engages the upper mold plate, downward movement of the projecting element moves the intermediate plate to the second, lower position.

2. The apparatus of claim 1, wherein the upper mold plate is interchangeably removable for varying dimensions and spacing of the openings.

3. The apparatus of claim 2, wherein the upper mold plate is interchangeably removable from the rear wall with threaded fasteners.

4. The apparatus of claim 1, further comprising a lower bar positioned between the base and the rear wall, wherein the lower bar is for limiting downward movement of the intermediate plate.

5. The apparatus of claim 1, further comprising an upper bar attached between the rear wall and the upper mold plate.

6. The apparatus of claim 1, wherein the intermediate plate comprises a pair of spaced apart outwardly extending arms, the arms extending perpendicular to the rear wall, wherein the arms are configured for pulling taut the torso encircling portion when the intermediate plate is moved vertically downward.

7. The apparatus of claim 1, wherein the intermediate plate extends through a slot in the rear wall, the slot having a height and a width.

8. The apparatus of claim 7, further comprising at least one post extending the height of the slot and through the intermediate plate, wherein the intermediate plate is vertically movable along the at least one post.

9. The apparatus of claim 8, wherein the at least one post further comprises a spring element, wherein the spring element is for biasing the intermediate plate to the first, upper position.

10. The apparatus of claim 9, wherein the spring element comprises a compression spring having a spring constant of between about 10 lb and 25 lb.

11. A method of molding breast cups in a seamless circularly-knitted brassiere having a breast-covering portion and a torso encircling portion, the method comprising:
   (a) placing the breast-covering portion of a substantially completed seamless brassiere on an upper surface of an upper mold plate;
   (b) aligning breast cup areas of the brassiere with a corresponding pair of mold openings in the upper mold plate;

(c) wrapping the torso encircling portion of the brassiere around a bottom surface of a vertically moveable lower plate;

(d) causing the lower plate to move vertically downward relative to the upper mold plate, wherein the torso encircling portion of the brassiere and the breast covering portion are pulled taut; and (e) lowering a male mold portion downwardly to engage the upper mold plate, wherein male mold elements move through the openings in the upper mold plate to stretch and permanently mold a pair of breast cups in the brassiere.

12. The method of claim 11, wherein lowering the male mold portion engages a projecting element extending upwardly from the lower plate so that the lower plate moves vertically downward.

13. The method of claim 11, further comprising raising the male mold portion after molding the pair of breast cups, wherein raising the male mold portion biases the lower plate upwardly.

* * * * *